(12) United States Patent
Gilad et al.

(10) Patent No.: US 10,616,164 B2
(45) Date of Patent: *Apr. 7, 2020

(54) SYSTEMS AND METHODS FOR DISPLAYING LABELS IN A CLUSTERING IN-BOX ENVIRONMENT

(71) Applicant: Google LLC, Mountain View, CA (US)

(72) Inventors: Itamar Gilad, Zurich (CH); Thompson Alexander Ivor Gawley, Palo Alto, CA (US); Jason Gibbs Cornwell, Seattle, WA (US); Andrew Ward Moedinger, Zurich (CH); Jeroen Daniël Jillissen, Campbell, CA (US); Gregory R. Bullock, Zurich (CH); Kevin Smilak, Los Altos, CA (US)

(73) Assignee: Google LLC, Mountain View, CA (US)

( * ) Notice: Subject to any disclaimer, the term of this patent is extended or adjusted under 35 U.S.C. 154(b) by 71 days.

This patent is subject to a terminal disclaimer.

(21) Appl. No.: 16/038,019

(22) Filed: Jul. 17, 2018

(65) Prior Publication Data

US 2018/0324131 A1 Nov. 8, 2018

Related U.S. Application Data

(63) Continuation of application No. 14/187,069, filed on Feb. 21, 2014, now Pat. No. 10,033,679.

(60) Provisional application No. 61/922,565, filed on Dec. 31, 2013.

(51) Int. Cl.
*H04L 12/58* (2006.01)

(52) U.S. Cl.
CPC .................. *H04L 51/22* (2013.01)

(58) Field of Classification Search
None
See application file for complete search history.

(56) References Cited

U.S. PATENT DOCUMENTS

| 4,914,650 A | 4/1990 | Sriram |
| 5,948,040 A | 9/1999 | DeLorme et al. |
| 5,948,058 A | 9/1999 | Kudoh et al. |

(Continued)

OTHER PUBLICATIONS

Cohen, Learning Rules that classify E-mail, Feb. 22, 2002, 8 pgs.

(Continued)

*Primary Examiner* — Tuan S Nguyen
(74) *Attorney, Agent, or Firm* — Botos Churchill IP Law

(57) ABSTRACT

Systems and methods for displaying electronic messages are disclosed. In one aspect, a method is performed at a computing device. The method includes: (1) receiving a plurality of electronic messages; (2) assigning a first subset of the messages to a predefined group category based on a set of content-based clustering rules and content in respective bodies of the messages; (3) concurrently displaying a second subset of the messages and a cluster graphic corresponding to the predefined group category, where the cluster graphic includes a label that describes the predefined group category; (4) while concurrently displaying the second subset of electronic messages and the cluster graphic, receiving user selection of the cluster graphic; and (5) in response, displaying a plurality of messages in the predefined group category, including displaying at least one message from the first subset of messages.

20 Claims, 13 Drawing Sheets

(56) References Cited

U.S. PATENT DOCUMENTS

| | | |
|---|---|---|
| 6,044,260 A | 3/2000 | Eaton et al. |
| 6,057,841 A | 5/2000 | Thurlow et al. |
| 6,147,977 A | 11/2000 | Thro et al. |
| 6,232,972 B1 | 5/2001 | Arcuri et al. |
| 6,252,597 B1 | 6/2001 | Lokuge |
| 6,333,973 B1 | 12/2001 | Smith et al. |
| 6,351,764 B1 | 2/2002 | Voticky et al. |
| 6,421,709 B1 | 7/2002 | McCormick et al. |
| 6,507,866 B1 | 1/2003 | Barchi |
| 6,700,591 B1 | 3/2004 | Sharpe |
| 6,704,772 B1 | 3/2004 | Ahmed et al. |
| 6,725,228 B1 | 4/2004 | Clark et al. |
| 6,778,642 B1 | 8/2004 | Schmidt, Jr. et al. |
| 6,961,341 B1 | 11/2005 | Krishnan |
| 7,120,865 B1 | 10/2006 | Horvitz et al. |
| 7,167,910 B2 | 1/2007 | Farnham et al. |
| 7,194,516 B2 | 3/2007 | Giacobbe et al. |
| 7,359,947 B2 | 4/2008 | Kelley et al. |
| 7,386,535 B1 | 6/2008 | Kalucha et al. |
| 7,415,504 B2 | 8/2008 | Schiavone et al. |
| 7,421,690 B2 | 9/2008 | Forstall et al. |
| 7,429,993 B2 | 9/2008 | Hui |
| 7,475,120 B1 | 1/2009 | Ngo et al. |
| 7,506,263 B1 | 3/2009 | Johnston et al. |
| 7,536,652 B2 | 5/2009 | Uemura et al. |
| 7,539,732 B2 | 5/2009 | Kelso et al. |
| 7,568,011 B2 | 7/2009 | Bocking et al. |
| 7,689,656 B2 | 3/2010 | McCarthy et al. |
| 7,707,255 B2 | 4/2010 | Satterfield et al. |
| 7,730,137 B1 | 6/2010 | Toomey |
| 7,765,212 B2 | 7/2010 | Surendran et al. |
| 7,788,329 B2 | 8/2010 | Barrett et al. |
| 7,814,155 B2 | 10/2010 | Buchheit et al. |
| 7,895,279 B2 | 2/2011 | Forstall et al. |
| 7,895,537 B2 | 2/2011 | Gruen et al. |
| 7,958,099 B2 | 6/2011 | Kang et al. |
| 7,979,501 B1 | 7/2011 | Coleman et al. |
| 7,996,900 B2 | 8/2011 | Gillum et al. |
| 8,010,613 B2 | 8/2011 | Oral et al. |
| 8,031,845 B2 | 10/2011 | Gruen et al. |
| 8,041,745 B2 | 10/2011 | Newton et al. |
| 8,065,369 B2 | 11/2011 | Turski et al. |
| 8,095,400 B2 | 1/2012 | Herde et al. |
| 8,108,469 B2 | 1/2012 | Kent, Jr. et al. |
| 8,140,703 B2 | 3/2012 | Morris et al. |
| 8,150,926 B2 | 4/2012 | Sundararajan et al. |
| 8,150,930 B2 | 4/2012 | Satterfield et al. |
| 8,176,130 B2 | 5/2012 | Daniell |
| 8,224,902 B1 | 7/2012 | Glasser et al. |
| 8,230,350 B2 | 7/2012 | Dodsworth |
| 8,233,885 B2 | 7/2012 | Kansal et al. |
| 8,239,874 B2 | 8/2012 | Anderson et al. |
| 8,281,382 B1 | 10/2012 | Sanyal et al. |
| 8,286,089 B2 | 10/2012 | Hardy et al. |
| 8,307,029 B2 | 11/2012 | Davis et al. |
| 8,375,307 B2 | 2/2013 | Kim |
| 8,375,400 B2 | 2/2013 | Sutedja et al. |
| 8,402,096 B2 | 3/2013 | Affronti et al. |
| 8,448,084 B2 | 5/2013 | Brichter |
| 8,499,042 B2 | 7/2013 | Brown, Jr. et al. |
| 8,499,048 B2 | 7/2013 | Malik et al. |
| 8,533,274 B2 | 9/2013 | Buchheit et al. |
| 8,560,619 B1 | 10/2013 | Huston et al. |
| 8,572,277 B2 | 10/2013 | Morris et al. |
| 8,577,967 B1 | 11/2013 | Chavez et al. |
| 8,583,747 B2 | 11/2013 | Buchheit et al. |
| 8,626,851 B2 | 1/2014 | Buchheit et al. |
| 8,656,289 B1 | 2/2014 | Dodsworth |
| 8,701,018 B1 | 4/2014 | Keel et al. |
| 2002/0143871 A1 | 10/2002 | Meyer et al. |
| 2002/0160757 A1 | 10/2002 | Shavit et al. |
| 2003/0020749 A1 | 1/2003 | Abu-Hakima et al. |
| 2003/0154212 A1 | 8/2003 | Schirmer et al. |
| 2003/0177190 A1 | 9/2003 | Moody et al. |
| 2003/0195811 A1 | 10/2003 | Hayes, Jr. et al. |
| 2003/0214534 A1 | 11/2003 | Uemura et al. |
| 2003/0233419 A1 | 12/2003 | Beringer |
| 2004/0078190 A1 | 4/2004 | Fass et al. |
| 2004/0153456 A1 | 8/2004 | Charnock et al. |
| 2004/0199529 A1 | 10/2004 | Clark et al. |
| 2004/0254998 A1 | 12/2004 | Horvitz |
| 2005/0004990 A1 | 1/2005 | Durazo et al. |
| 2005/0018819 A1 | 1/2005 | Schmidt, Jr. et al. |
| 2005/0080851 A1 | 4/2005 | Kent, Jr. et al. |
| 2005/0080862 A1 | 4/2005 | Kent, Jr. et al. |
| 2005/0102366 A1 | 5/2005 | Kirsch |
| 2005/0114781 A1 | 5/2005 | Brownholtz et al. |
| 2005/0138552 A1 | 6/2005 | Venolia |
| 2005/0193076 A1 | 9/2005 | Flury et al. |
| 2005/0193345 A1 | 9/2005 | Klassen et al. |
| 2005/0228790 A1 | 10/2005 | Ronnewinkel et al. |
| 2005/0246658 A1 | 11/2005 | Uemura et al. |
| 2005/0256968 A1 | 11/2005 | Johnson |
| 2006/0010215 A1 | 1/2006 | Clegg et al. |
| 2006/0031340 A1 | 2/2006 | Mathew et al. |
| 2006/0031347 A1 | 2/2006 | Sahi |
| 2006/0059238 A1 | 3/2006 | Slater et al. |
| 2006/0064410 A1 | 3/2006 | Razza et al. |
| 2006/0069734 A1 | 3/2006 | Gersh et al. |
| 2006/0075044 A1 | 4/2006 | Fox et al. |
| 2006/0095466 A1 | 5/2006 | Stevens et al. |
| 2006/0123360 A1 | 6/2006 | Anwar et al. |
| 2006/0173824 A1 | 8/2006 | Bensky et al. |
| 2006/0173964 A1 | 8/2006 | Oohama et al. |
| 2006/0206495 A1 | 9/2006 | Van Gageldonk et al. |
| 2006/0277504 A1 | 12/2006 | Zinn |
| 2007/0005592 A1 | 1/2007 | Kender et al. |
| 2007/0038718 A1 | 2/2007 | Khoo et al. |
| 2007/0106729 A1 | 5/2007 | Adams et al. |
| 2007/0156669 A1 | 7/2007 | Marchisio et al. |
| 2007/0203991 A1 | 8/2007 | Fisher et al. |
| 2007/0262861 A1 | 11/2007 | Anderson et al. |
| 2007/0277113 A1 | 11/2007 | Agrawal et al. |
| 2007/0299923 A1 | 12/2007 | Skelly et al. |
| 2008/0215687 A1 | 9/2008 | Madnani |
| 2009/0037350 A1 | 2/2009 | Rudat |
| 2009/0089798 A1 | 4/2009 | Anderson et al. |
| 2010/0017492 A1 | 1/2010 | Reistad |
| 2010/0030798 A1 | 2/2010 | Kumar et al. |
| 2010/0049806 A1 | 2/2010 | Haynes et al. |
| 2010/0056221 A1 | 3/2010 | Park |
| 2010/0114855 A1 | 5/2010 | Li et al. |
| 2010/0199180 A1 | 8/2010 | Brichter |
| 2010/0262922 A1 | 10/2010 | Fan et al. |
| 2010/0278453 A1 | 11/2010 | King |
| 2010/0306249 A1 | 12/2010 | Hill et al. |
| 2011/0010182 A1 | 1/2011 | Turski et al. |
| 2011/0072363 A1 | 3/2011 | Mandel et al. |
| 2011/0231499 A1* | 9/2011 | Stovicek ............ H04M 1/72547 709/206 |
| 2011/0289106 A1 | 11/2011 | Rankin, Jr. et al. |
| 2011/0307804 A1 | 12/2011 | Spierer |
| 2012/0013805 A1 | 1/2012 | Mihara et al. |
| 2012/0102037 A1 | 4/2012 | Ozonat |
| 2012/0110085 A1 | 5/2012 | Malik et al. |
| 2012/0131095 A1 | 5/2012 | Luna et al. |
| 2012/0149342 A1 | 6/2012 | Cohen et al. |
| 2012/0180021 A1 | 7/2012 | Byrd et al. |
| 2012/0185781 A1 | 7/2012 | Guzman et al. |
| 2012/0185797 A1 | 7/2012 | Thorsen et al. |
| 2012/0198053 A1 | 8/2012 | Ozhan et al. |
| 2012/0204191 A1 | 8/2012 | Shia et al. |
| 2012/0210334 A1 | 8/2012 | Sutedja et al. |
| 2012/0271908 A1 | 10/2012 | Luna et al. |
| 2012/0272160 A1 | 10/2012 | Spivack et al. |
| 2013/0024440 A1 | 1/2013 | Dimassimo et al. |
| 2013/0055099 A1 | 2/2013 | Yao et al. |
| 2013/0055105 A1 | 2/2013 | Spierer |
| 2013/0110953 A1 | 5/2013 | Sutedja et al. |
| 2013/0159879 A1 | 6/2013 | Affronti et al. |
| 2013/0165165 A1 | 6/2013 | Macek et al. |
| 2013/0166280 A1 | 6/2013 | Quast et al. |
| 2013/0212189 A1 | 8/2013 | Velissarakos |
| 2013/0297604 A1 | 11/2013 | Sutedja et al. |

(56) References Cited

U.S. PATENT DOCUMENTS

| | | |
|---|---|---|
| 2013/0305187 A1 | 11/2013 | Phillips et al. |
| 2013/0325705 A1 | 12/2013 | Laird et al. |
| 2013/0332850 A1 | 12/2013 | Bovet et al. |
| 2014/0046945 A1 | 2/2014 | Deolalikar et al. |
| 2014/0047050 A1 | 2/2014 | Kim et al. |
| 2014/0052797 A1 | 2/2014 | Lessard et al. |
| 2014/0096032 A1 | 4/2014 | Mayblum et al. |
| 2014/0096033 A1 | 4/2014 | Blair |
| 2014/0115495 A1 | 4/2014 | Wetherell et al. |
| 2014/0279016 A1 | 9/2014 | Capel et al. |
| 2014/0280619 A1 | 9/2014 | Banatwala et al. |
| 2014/0280635 A1 | 9/2014 | Bengochea et al. |
| 2014/0310324 A1 | 10/2014 | Branton et al. |
| 2014/0344711 A1* | 11/2014 | Hallerstrom Sjostedt .................. H04L 51/22 715/752 |
| 2014/0359480 A1 | 12/2014 | Vellal et al. |
| 2015/0088784 A1 | 3/2015 | Dhara et al. |

OTHER PUBLICATIONS

Soni, "An automatic email mining approach using semantic non-parametric K-means++ clustering", May 2013, 104 pgs.

Kandogan et al., "Avatar Semantic Search: A Database Approach to Information Retrieval", 2006, 3 pgs.

* cited by examiner

400

Google
Gmail ▾
Home
Outbox
Trash
Spam
Updates
Promos
Purchases
Social
Travel
Fast Create New

| | C | Clay Kaplan – Thought you'd be interested. Here's some p... |

402-2

| P | Promotions<br>View all Promotions |

416

| S | Half off all Ankle Boots<br>Shoe Store – All ankle boots are slashed to 50% off for... |
| T | Dinosaur Clearance Sale<br>Toy Store – Get your dinosaur toys before they disappear! |
| H | Organic Mongolian Rutabagas<br>All Foods – Full of vitamins! Here are five great recipes... |
| G | Try Google Checkout Today!<br>Google – Congrats! You've been selected to try Google C... |
| D | Travel for only $199<br>RT Flights to Denver, Colorado from SFO onl... |
| W | BOGO Gloves<br>Winter Sports Shop – Buy a right glove, get the left one fr... |
| S | One month of free shipping<br>Snack Store – Get your chips and soda delivered to your... |
| T | Long Distance Rates as Low as 1cent/minute<br>TelecomCo – Call your mom! It's only 1 cent/minute to 20... |
| G | Grand Bicycle Pre-orders<br>Game Store – Pre-order your copy of the video game of th... |

407

| M | (no subject)<br>me, Carrie – Yes! Thursday is my last day. I can't wait. I'm ... |
| S | 2 New Social Updates<br>Google+, Tom's Blog |
| J | dinner plans!<br>Jamie, Sarah – Sounds good - I'm in! |

Yesterday

| E | Event Invitation: Ellen's birthday party<br>Oct 1, 3:00pm. Polish Polka Restaurant, 1112 Verd... |

Google

Gmail ▼

Home
Outbox
Trash
Spam
Updates
Promos
Purchases
Social
Travel
Trash
Create New

Today

| C | Big Sur<br>Clay Kaplan – Thought you'd be interested. Here's some p... |

402-3

| P | Promotions<br>Shoe Store, Toy Store, All Foods, Google, +5 more |

| M | (no subject)<br>me, Carrie – Yes! Thursday is my last day. I can't wait. I'm ... |

406

| S | 2 New Social Updates<br>Google+, Tom's Blog |

| J | dinner plans!<br>Jamie, Sarah – Sounds good - I'm in! |

Yesterday

| E | Event Invitation: Ellen's birthday party<br>Event – Oct 1, 3:00pm. Polish Polka Restaurant, 1112 Verd... |

| A | Pics!<br>Anna – Here you go. -Anna |

| M | Would you be interested in doing this with me?<br>me, Emily – Sure, that looks like a lot of fun! It's $30/class ... |

Sunday

| T | Print at Home<br>ticket orders – Thank you for your order. Your e-ticket is att... |

| R | Your reservation confirmation for 2 at Dosa on ...<br>DOSA – You are confirmed for a reservation for 2 at DOSA... |

Aug 16

| B | Home!<br>Brent, me – Glad to hear you're home safely. Let's talk soon! |

| M | (no subject)<br>me – http://www.xhaoeiz1nq.com/3308/15-things-you-sho... |

Google

Gmail ▼

Home
Outbox
Trash
Spam
Updates
Promos
Purchases
Social
Travel
Trash

Create New

Today

| C | Big Sur<br>Clay Kaplan – Thought you'd be interested. Here's some p... |

402-4

| P | 9 New 9 Unread Promotions<br>Shoe Store, Toy Store, All Foods, Google, +5 more |

| M | (no subject)<br>me, Carrie – Yes! Thursday is my last day. I can't wait. I'm ... |

406

| S | 2 New Social Updates<br>Google+, Tom's Blog |

| J | dinner plans!<br>Jamie, Sarah – Sounds good - I'm in! |

Yesterday

| E | Event Invitation: Ellen's birthday party<br>Event – Oct 1, 3:00pm. Polish Polka Restaurant, 1112 Verd... |

| A | Pics!<br>Anna – Here you go. -Anna |

| M | Would you be interested in doing this with me?<br>me, Emily – Sure, that looks like a lot of fun! It's $30/class ... |

Sunday

| T | Print at Home<br>ticket orders – Thank you for your order. Your e-ticket is att... |

| R | Your reservation confirmation for 2 at Dosa on ...<br>DOSA – You are confirmed for a reservation for 2 at DOSA... |

Aug 16

| B | Home!<br>Brent, me – Glad to hear you're home safely. Let's talk soon! |

| M | (no subject)<br>me – http://www.xhaoeiz1nq.com/3308/15-things-you-sho... |

| | C | Clay Kaplan – Thought you'd be interested. Here's some p... |

402-6

| P | 5 Recent Promotions<br>View all Promotions |
|---|---|
| S | Half off all Ankle Boots<br>Shoe Store – All ankle boots are slashed to 50% off for... |
| T | Dinosaur Clearance Sale<br>Toy Store – Get your dinosaur toys before they disappear! |
| H | Organic Mongolian Rutabagas<br>All Foods – Full of vitamins! Here are five great recipes... |
| G | Try Google Checkout Today!<br>Google – Congrats! You've been selected to try Google C... |
| D | Travel for only $199<br>RT Flights to Denver, Colorado from SFO onl... |
| W | BOGO Gloves<br>Winter Sports Shop – Buy a right glove, get the left one fr... |
| S | One month of free shipping<br>Snack Store – Get your chips and soda delivered to your... |
| T | Long Distance Rates as Low as 1cent/minute<br>TelecomCo – Call your mom! It's only 1 cent/minute to 20... |
| G | Grand Bicycle Pre-orders<br>Game Store – Pre-order your copy of the video game of th... |

| M | (no subject)<br>me, Carrie – Yes! Thursday is my last day. I can't wait. I'm ... |
|---|---|
| S | 2 New Social Updates<br>Google+, Tom's Blog |
| J | dinner plans!<br>Jamie, Sarah – Sounds good - I'm in! |

Yesterday

| E | Event Invitation: Ellen's birthday party<br>Oct 1, 3:00pm. Polish Polka Restaurant, 1112 Verd... |

502 Concurrently display (i) a user interface object that represents a group of messages and (ii) one or more first indicia of a number of messages, that have a predefined display status, in the group of messages while foregoing displaying more than one message of the group of messages

504 Prior to the concurrently displaying, select the group of messages, from a plurality of messages received or sent by a single user, into the user interface object using a set of content-based clustering rules that are independent of relatedness between the messages in the group of messages

506 Displaying the user interface object that represents the group of messages includes displaying a portion of a message in the group of messages while foregoing displaying one or more messages, in the group of messages, other than the respective message

508 Displaying the user interface object that represents the group of messages includes displaying a tab that corresponds to the group of messages

510 Messages, that have the predefined display status, in the group of messages are messages, in the group of messages, that have not been displayed previously

512 Concurrently display (i) the user interface object, (ii) one or more second indicia of a number of messages, that have a predefined read status, in the group of messages, and (iii) the one or more first indicia of the number of messages, that have the predefined display status, in the group of messages

514 Receive a selection of the user interface object (A)

Figure 5A

516 In response to receiving the selection of the user interface object, display messages in the group of messages 518 Each message in messages in the group of messages is categorized and arranged in accordance with a dichotomous categorization 520 The dichotomous categorization is whether a respective message has been received within a predefined time period 522 Concurrently display (i) the one or more first indicia of the number of messages, that have the predefined display status, in the group of messages and (ii) one or more second indicia of a number of messages, in the group of messages, that have been received within the predefined time period. Modifying the one or more displayed first indicia of the number of messages, that have the predefined display status, in the group of messages includes ceasing to display the one or more first indicia while maintaining the display of the one or more second indicia.

524 In accordance with displaying the messages in the group of messages, modify the one or more displayed first indicia of the number of messages, that have the predefined display status, in the group of messages 526 Modifying the one or more displayed first indicia of the number of messages, that have the predefined display status, in the group of messages includes ceasing to display the one or more first indicia of the number of messages, that have the predefined display status, in the group of messages 528 Modify the one or more displayed first indicia of the number of messages after a predetermined period of time subsequent to displaying the messages in the group of messages

Figure 5B

SYSTEMS AND METHODS FOR DISPLAYING LABELS IN A CLUSTERING IN-BOX ENVIRONMENT

CROSS REFERENCE TO RELATED APPLICATION

This application is a continuation of U.S. patent application Ser. No. 14/187,069, filed Feb. 21, 2014, entitled "Systems and Methods for Displaying Unseen Labels in a Clustering In-Box Environment," which claims priority to U.S. Provisional Patent Application No. 61/922,565, filed Dec. 31, 2013, entitled "Systems and Methods for Displaying Unseen Labels in a Clustering In-Box Environment," each of which is hereby incorporated by reference herein in its entirety.

TECHNICAL FIELD

The embodiments disclosed herein relate generally to displaying electronic messages in a messaging application.

BACKGROUND

A typical user of a messaging application often receives a large number of electronic messages, such as emails, social network posts, contact information, search queries and calendar entries every day. Such a large number of electronic messages can be cumbersome to navigate through. Messaging application users wish to navigate through a listing of such electronic messages quickly to identify relevant messages. However, the volume of electronic messages makes it difficult to do so.

The above identified technical problems are reduced or eliminated by the systems and methods disclosed herein.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings.

FIGS. 4A-4H are depictions of example user interfaces of a messaging application for displaying electronic messages in accordance with some embodiments.

FIGS. 5A-5B are example flow charts illustrating methods for displaying messages, in accordance with some embodiments.

SUMMARY

Figure 1:
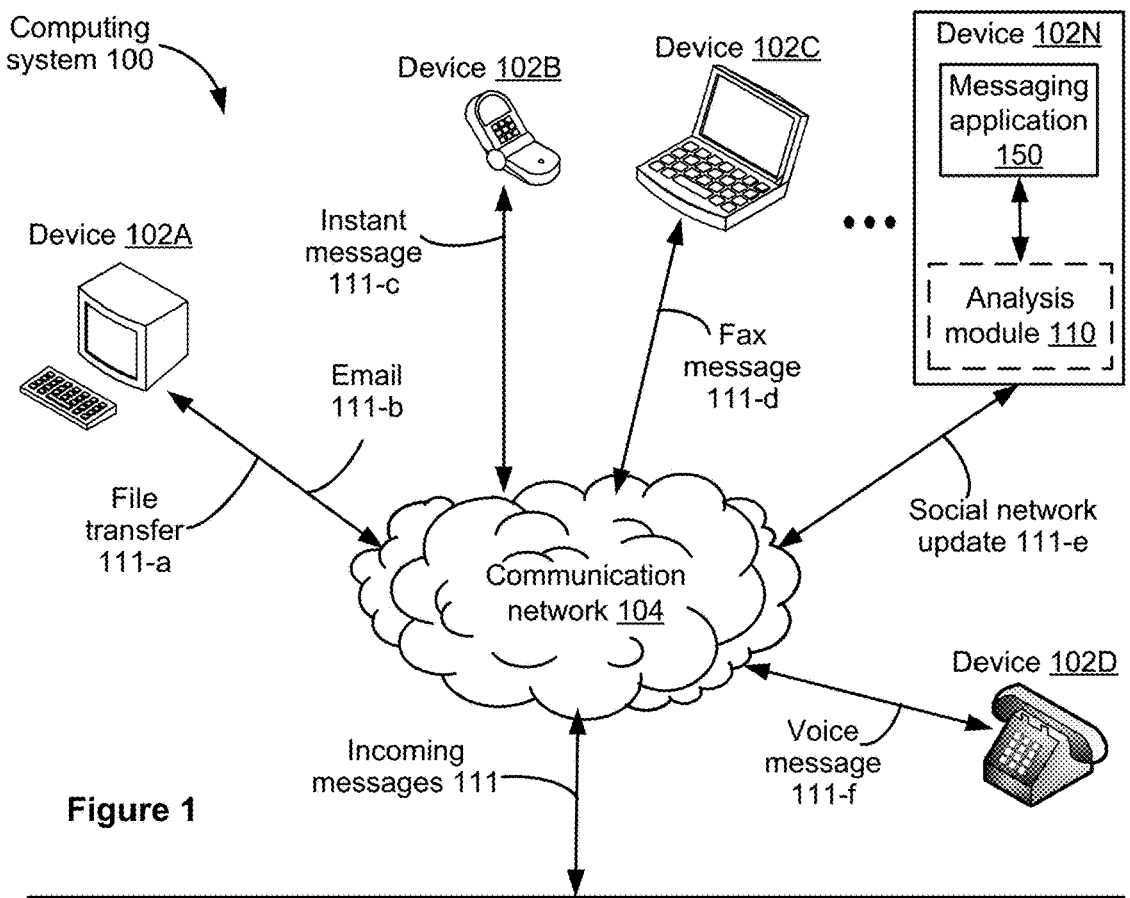
FIG. 1 is an example block diagram illustrating a computing system, in accordance with some embodiments.
Figure 1:
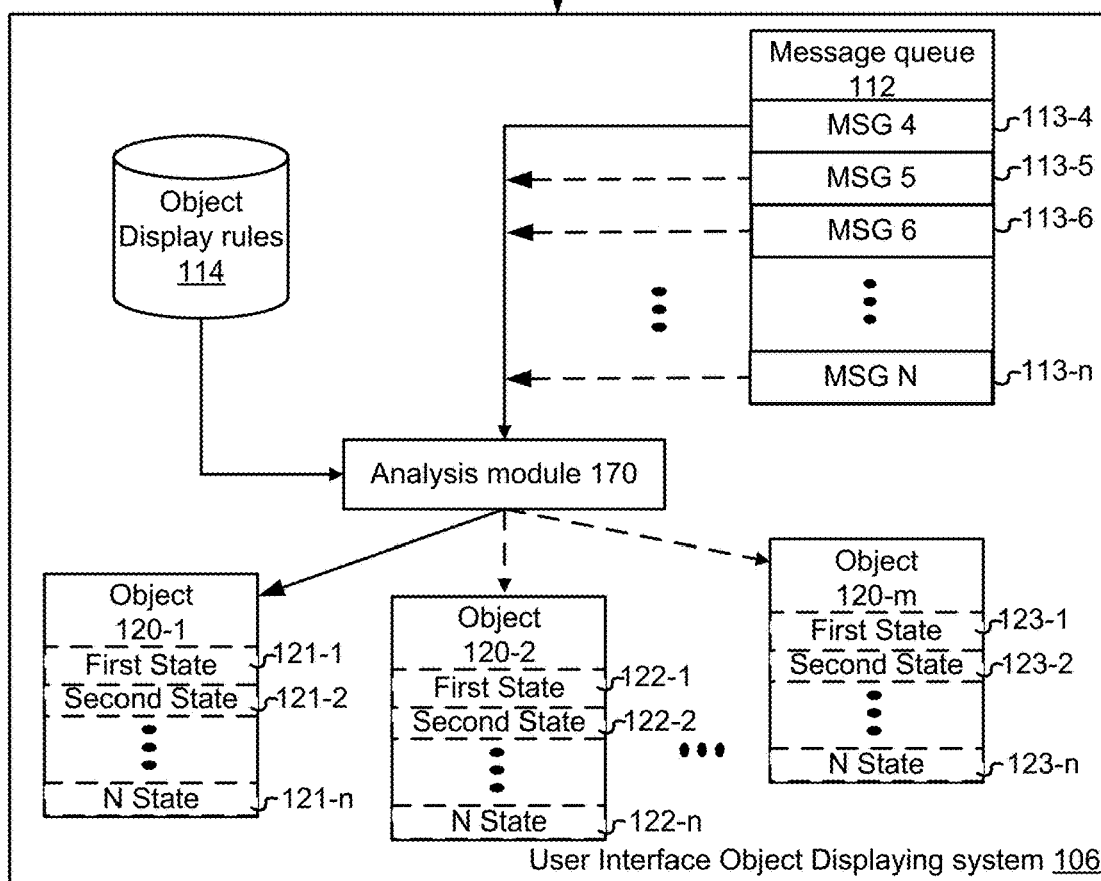

Technical solutions (e.g., computing systems, methods, and non-transitory computer readable storage mediums) for presenting a number of messages that have a predefined display status (e.g., unseen messages) in a cluster of electronic messages are provided in the present application.

In some embodiments, a method for displaying electronic messages includes, at a computing device, concurrently displaying (i) a user interface object that represents a group of messages and (ii) one or more first indicia of a number of messages, that have a predefined display status, in the group of messages while foregoing displaying more than one message of the group of messages. The method also includes receiving a selection of the user interface object. The method further includes, in response to receiving the selection of the user interface object, displaying messages in the group of messages, and, in accordance with displaying the messages in the group of messages, modifying the one or more displayed first indicia of the number of messages, that have the predefined display status, in the group of messages.

In some embodiments, displaying the user interface object that represents the group of messages includes displaying a portion of a message in the group of messages while foregoing displaying one or more messages, in the group of messages, other than the respective message.

In some embodiments, displaying the user interface object that represents the group of messages includes displaying a tab that corresponds to the group of messages.

In some embodiments, modifying the one or more displayed first indicia of the number of messages, that have the predefined display status, in the group of messages includes ceasing to display the one or more first indicia of the number of messages, that have the predefined display status, in the group of messages after a predetermined period of time has elapsed.

In some embodiments, each message in messages in the group of messages is categorized and arranged in accordance with a dichotomous categorization.

In some embodiments, the dichotomous categorization is whether a respective message has been received within a predefined time period.

In some embodiments, the method includes concurrently displaying the one or more first indicia of the number of messages, that have the predefined display status, in the group of messages with one or more second indicia of a number of messages, in the group of messages, that have been received within the predefined time period. Modifying the one or more displayed first indicia of the number of messages, that have the predefined display status, in the group of messages includes ceasing to display the one or more first indicia while maintaining the display of the one or more second indicia.

In some embodiments, messages, that have the predefined display status, in the group of messages are messages, in the group of messages, that have not been displayed previously.

In some embodiments, the method includes concurrently displaying (i) the user interface object, (ii) one or more second indicia of a number of messages, that have a predefined read status, in the group of messages, (iii) the one or more first indicia of the number of messages, that have the predefined display status, in the group of messages.

In some embodiments, the method includes modifying the one or more displayed first indicia of the number of messages after a predetermined period of time subsequent to displaying the messages in the group of messages.

In some embodiments, the method includes, prior to the concurrently displaying, selecting the group of messages, from a plurality of messages received or sent by a single user, into the user interface object using a set of content-based clustering rules that are independent of relatedness between the messages in the group of messages.

In other aspects of the present disclosure, computing systems and non-transitory computer storage mediums for executing one or more steps of any of the above-described methods are also disclosed.

DETAILED DESCRIPTION

As explained above, a typical user of a messaging application often receives a large number of electronic messages, such as emails, social network posts, contact information, search queries and calendar entries every day. Such a large number of electronic messages can be cumbersome to navigate through. In particular, when a user receives a large number of incoming messages, the user often needs to mark all of the incoming messages (e.g., as a read message) so that the user does not need to revisit the same messages. However, this is time-consuming and inefficient.

Message clustering simplifies a user interface for displaying messages, because clustered messages are represented by a single user interface object, instead using a single user interface object for each message in the group.

The embodiments described herein provide various technical solutions to improving access to electronic messages, and in particular to the above-identified problems, by providing techniques for displaying electronic messages to a user. Instead of requiring a user to read every incoming electronic message (or mark every incoming electronic message as read), an indication of a number of unseen electronic messages (e.g., electronic messages that have not been previously displayed) in a cluster is used. The indication is removed when the cluster is selected by the user and unseen electronic messages in the cluster are presented to the user. The displayed electronic messages are no longer marked as unseen, and the user need not focus on these messages, unless the user marks these messages in some other way (e.g., as important messages). Thus, the indication of a number of unseen messages is used to eliminate the need for the user to read, or mark as read, all of the incoming messages, thereby improving efficiency in navigating through electronic messages.

Details of embodiments are now described in relation to the Figures.

FIG. 1 is a block diagram illustrating a computing system 100, in accordance with some embodiments.

In some embodiments, the computing system 100 includes one or more devices 102 (e.g., device 102A, 102B, 102C, 102D . . . , and 102N), a communication network 104, and a user interface object displaying system 106 (also called herein an object displaying system). In some embodiments, a device 102 is a phone (mobile or landline, smart phone or otherwise), a tablet, a computer (mobile or otherwise), a fax machine, or an audio/video recorder.

In some embodiments, a device 102 obtains an electronic message from (e.g., drafted or generated by) a user of the device 102, and transmits the electronic message to the user interface object displaying system 106 for displaying with other electronic messages. For example, after determining that user Jack sends an electronic message to user Mary, the device 102 transmits the electronic message to the user interface object displaying system 106, which processes the electronic message into a user interface object for display in a listing of electronic messages.

In some embodiments, an electronic message is a file transfer 111-*a* (e.g., a photo, document, or video download/upload), an email 111-*b*, an instant message 111-*c* (e.g., a GOOGLE HANGOUT message), a fax message 111-*d*, a social network update 111-*e* (e.g., a GOOGLE PLUS update), or a voice message 111-*f*. In some embodiments, an electronic message is contact information, an indication of a document, a calendar entry, an email label, a recent search query, a suggested search query, or a web search result.

In some embodiments, a device 102 includes a messaging application 150 and optionally an analysis module 110. In some embodiments, the messaging application 150 processes incoming and outgoing electronic messages into and from the device 102, such as an outgoing email sent by a user of the device 102 to another user, and a chat message by another user to a user of the device 102. In some embodiments the messaging application 150 is an e-mail application. In some embodiments, the analysis module 110 resident on the device 102 balances processing load with the analysis module 170 resident on the user interface object displaying system 106. For example, after a user requests to send out a total of six emails, the analysis module 110 on the device 102 processes the first three emails (which, in some embodiments, include plain text emails, e.g., without HTML content or attachments, and thus might require less processing power), and the analysis module 170 on the user interface object displaying system 106 processes the remaining three emails (which, in some embodiments, include HTML content or attachments, and thus might require more processing power).

In some embodiments, the communication network 104 interconnects one or more devices 102 with each other, and with the user interface object displaying system 106. In some embodiments, the communication network 104 optionally includes the Internet, one or more local area networks (LANs), one or more wide area networks (WANs), other types of networks, or a combination of such networks.

Figure 3:
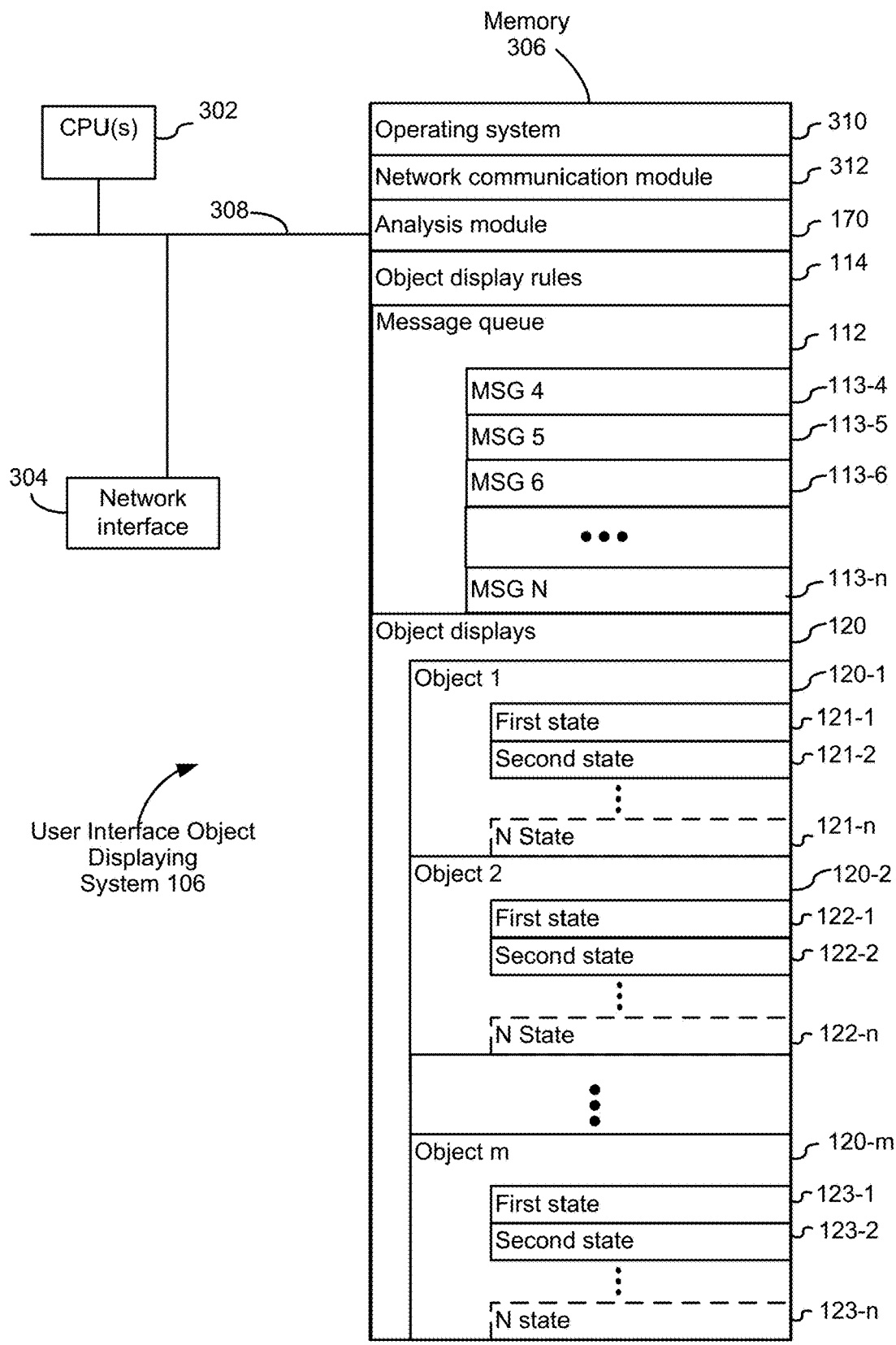
FIG. 3 is an example block diagram illustrating a user interface object displaying system, in accordance with some embodiments.

With reference to FIGS. 1 and 3, in some embodiments, the user interface object displaying system 106 includes an analysis module 170, a message queue 112 and a collection of object display rules 114 (e.g., user- or system-provided rules).

In some embodiments, the user interface object displaying system 106 analyzes content of incoming electronic messages (e.g., incoming messages 111), and assigns these electronic messages to one or more user interface objects (e.g., user interface objects 120-1, 120-2 . . . 120-*m*). In some embodiments, a user interface object (e.g., user interface object set 120-1) corresponds to one electronic message, with one or more display states (e.g., states 121-1, 121-2 . . . 121-*n*). For example, a user interface object 120-1 may consist of a single email from user Jack to user Mary, with a first display state of a short subset of text in the single email, and a second display state comprising the full text of the body of the email. In some embodiments, a user interface object (e.g., the user interface object 120-1) corresponds to more than one electronic message, with one or more display states (e.g., states 121-1, 121-2 . . . 121-*n*). For example, after analyzing the message body of an electronic message, the user interface object displaying system 106 determines (e.g., with a 90% confidence level) that the electronic message is a "Promotion" message (e.g., an email with advertising materials), and accordingly assigns the electronic message to a "Promotion" user interface object (e.g., the user interface object 120-2). In some embodiments, assigning an electronic message to a user interface object includes assigning a label (a "Promotion" or "Travel" label) that represents the user interface object. In some embodiments, the "Promotion" user interface object has at least three display states, a first display state (e.g., 121-1) displaying a short text-based summary of the various electronic messages in the user interface object 120-1, a second display state (e.g., 121-2) displaying a listing of the electronic messages in the user interface object 120-1 with a subset of the text for each respective electronic message, and a third display state (e.g., 121-3) comprising the full text of the body of one of the electronic messages in user interface object 120-1. In some embodiments, a user interface object comprises a single electronic message (e.g., a Social Network cluster comprising one social network update message). In some embodiments, a user interface object is a message cluster. Message clusters are defined on the basis of one or more clustering rules.

In some embodiments, the analysis module 170 analyzes an electronic message against object display rules 114, to determine how to display the electronic message. For example, an incoming electronic message is first analyzed to determine if it can be displayed as a part of one or more existing user interface objects (e.g., user interface objects 120-1 through 120-m). For example, if a user interface object 120-1 comprises a single electronic message from user Jack to user Mary, an electronic message comprising a reply from user Mary to user Jack would also be placed in the user interface object 120-1 by the analysis module 170. In another example, if the analysis module 170 analyzes an electronic message and determines that it is a single message corresponding to a social network post, and that none of the existing user interface objects corresponds to social network messages (or social network messages from that social network), the analysis module 170 places the single message corresponding to a social network post into a new user interface object. In some embodiments, the analysis module 170 also determines and updates one or more display states for the respective user interface object of the plurality of user interface objects (e.g., user interface object sets 120-1 . . . 120-m).

In some embodiments, the analysis module 110 is a software or hardware component resident on the device 102, such as a software package/application or a hardware chipset, for clustering electronic messages, and the analysis module 170 on the user interface object displaying system 106 is not used. In some embodiments, the analysis module 110 is not present and the analysis module 170, which exists separate from or independent of the device 102 is used (e.g., a GOOGLE mail processing server that is connected with but not part of the device 102, e.g., in the manner depicted in FIG. 1 with the analysis module 170). In still other embodiments, the analysis module 110 is a software or hardware component resident on the device 102, such as a software package/application or a hardware chipset, for displaying electronic messages, and the analysis module 170 on the user interface object displaying system 106 is also used. That is, both the analysis module 110 on the device 102 and the analysis module 170 on the user interface object displaying system 106 are used. For instance, in some such embodiments some object display rules 114 (e.g. user-specified rules) are implemented on the device 102 and implemented using the analysis module 110 and some object display rules 114 (e.g., system-provided rules) are implemented on the user interface object displaying system 106 and implemented using the analysis module 170. In some embodiments, some object display rules are generated on the user interface object displaying system 106 and distributed to the devices 102 for enforcement and/or implementation by the analysis module 110. For instance, a set of display rules can be distributed in the form of a profile or set of rules. In some embodiments, such distribution of rules to devices 102 occurs on a recurring basis (e.g., periodic or nonperiodic basis).

In some embodiments, the message queue 112 stores one or more electronic messages awaiting analysis by the analysis module 170, such as MSG 4, MSG 5, MSG 6, . . . and MSG N (FIG. 1, 113-4 . . . 113-n). In some embodiments, the message queue 112 includes different types of electronic messages, such as a file transfer 111-a (e.g., a photo, document, or video upload), an email 111-b, an instant message 111-c (e.g., a Google HANGOUT message), a fax message 111-d, a social network update 111-e (e.g., a GOOGLE PLUS update), a voice message 111-f, contact information, an indication of a document, a calendar entry, an email label, a recent search query, a suggested search query, or a web search result. In some embodiments, the message queue 112 includes electronic messages only.

In some embodiments, the collection of object display rules 114 include system- and user-specified display rules. In some embodiments, system-provided rules are determined by the user interface object displaying system 106 (e.g., default display rules), and user-specified rules are customized (e.g., added, removed, or modified) by a user.

Figure 2:
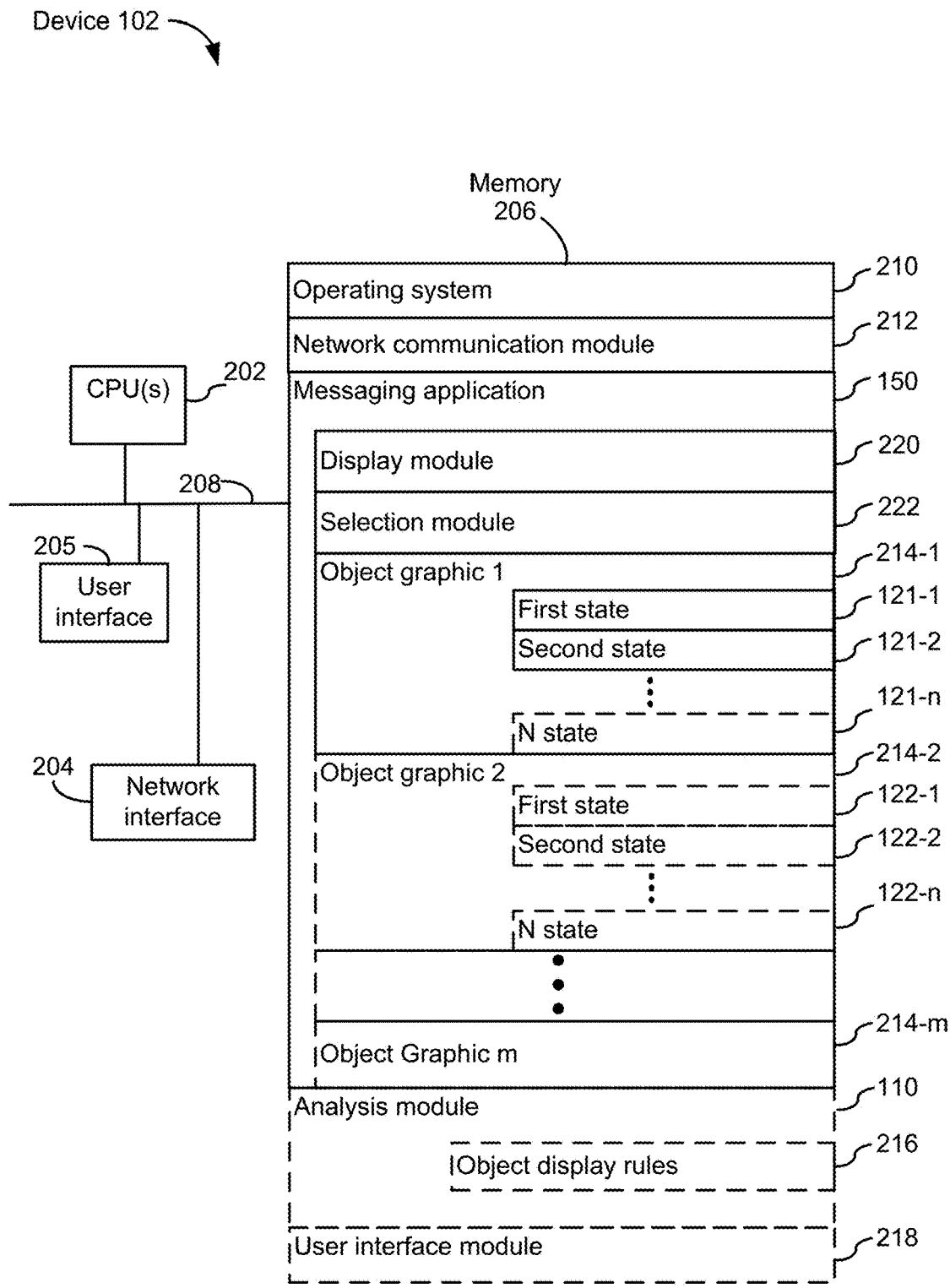
FIG. 2 is an example block diagram illustrating a computing device, in accordance with some embodiments.

FIG. 2 is a block diagram illustrating a computing device 102, in accordance with some embodiments. The device 102 in some embodiments includes one or more processing units CPU(s) 202 (also referred to as processors), one or more network interfaces 204, a user interface 205, a memory 206, and one or more communication buses 208 for interconnecting these components. The communication buses 208 optionally include circuitry (sometimes called a chipset) that interconnects and controls communications between system components. In some embodiments, the user interface 205 includes an input device (e.g., a keyboard, a mouse, a touchpad, a track pad, and a touch screen) for a user to interact with the device 102.

The memory 206 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 206 optionally includes one or more storage devices remotely located from the CPU(s) 202. The memory 206, or alternatively the non-volatile memory device(s) within the memory 206, comprises a non-transitory computer readable storage medium. In some embodiments, the memory 206 or alternatively the non-transitory computer readable storage medium stores the following programs, modules and data structures, or a subset thereof:

an operating system 210, which includes procedures for handling various basic system services and for performing hardware dependent tasks;

a network communication module (or instructions) 212 for connecting the device 102 with other devices (e.g., the user interface object displaying system 106 and the devices 102B through 102N) via one or more network interfaces 204 (wired or wireless), or the communication network 104 (FIG. 1);

a messaging application 150 for processing and displaying incoming and outgoing electronic messages;

optionally an analysis module 110 for analyzing content of (e.g., income and outgoing) electronic messages, and assigning electronic messages to one or more user interface object sets in accordance with therewith, in accordance with object display rules 216; and optionally a user interface module 218 for displaying user interface components or controls (e.g., textbox, button, radio button, drop-down list) to a user.

In some embodiments, the messaging application 150 includes:

a display module 220 for displaying and modifying one or more user interface objects that represent groups of messages and one or more indicia of numbers of messages that satisfy predefined criteria; and a selection module 222 for receiving a selection of one or more user interface objects (e.g., with a user input using the user interface 205).

In some embodiments, the display module 220 includes one or more sub-modules, such as (i) a user interface object display sub-module that initiates display of one or more user interface objects that represent groups of messages, and (ii) an indicia display sub-module that initiates display of one or more indicia of a number of messages that satisfy predefined criteria.

In some embodiments, the messaging application 150 displays electronic messages using one or more user interface object graphics. In some embodiments, the one or more user interface object graphics include one or more of:

- a user interface object graphic 1 (214-1) that visually displays any one of a First Display State (121-1), Second Display State (121-2), up to an Nth Display State (121-n)—where user interface object graphic 1 comprises one or more electronic messages;
- a user interface object graphic 2 (214-2) that visually displays any one of a First Display State (122-1), Second Display State (122-2), up to an Nth Display State (122-n)—where user interface object graphic 2 comprises one or more electronic messages; and
- a user interface object graphic m (214-m) that visually displays any one of a number of display states—where user interface object graphic m comprises one or more electronic messages.

In some embodiments, when the messaging application 150 includes multiple user interface object graphics, a first user interface object graphic (e.g., the user interface object graphic 1 (214-1)) is distinct from a second user interface object graphic (e.g., the user interface object graphic 2 (214-2)). In some embodiments, when the messaging application 150 includes multiple user interface object graphics, the second user interface object graphic does not include any electronic message in the first user interface object graphic.

In some embodiments, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various embodiments. In some embodiments, the memory 206 stores a subset of the modules and data structures identified above. Furthermore, the memory 206 may store additional modules and data structures not described above.

FIG. 3 is a block diagram illustrating a user interface object displaying system 106, in accordance with some embodiments. The user interface object displaying system 106 typically includes one or more processing units CPU(s) 302 (also referred to as processors), one or more network interfaces 304, memory 306, and one or more communication buses 308 for interconnecting these components. The communication buses 308 optionally include circuitry (sometimes called a chipset) that interconnects and controls communications between system components. The memory 306 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 306 optionally includes one or more storage devices remotely located from CPU(s) 302. The memory 306, or alternatively the non-volatile memory device(s) within the memory 306, comprises a non-transitory computer readable storage medium. In some embodiments, the memory 306 or alternatively the non-transitory computer readable storage medium stores the following programs, modules and data structures, or a subset thereof:

- an operating system 310, which includes procedures for handling various basic system services and for performing hardware dependent tasks;
- a network communication module (or instructions) 312 for connecting the user interface object displaying system 106 with other devices (e.g., the devices 102) via the one or more network interfaces 304 (wired or wireless), or the communication network 104 (FIG. 1);
- an analysis module 170 for conducting a content-based analysis on (e.g., incoming and outgoing) electronic messages and assigning electronic messages to one or more user interface object sets in accordance with the content based analysis;
- a message queue 112 for storing electronic messages awaiting processing by the analysis module 170, e.g., MSG 4, MSG 5, MSG 6, . . . and MSG n (113-4 . . . 113-n);
- a collection of object display rules 114, which specify or determine the corresponding display state or states for a respective user interface object; and
- one or more user interface object displays 120 for displaying electronic messages assigned thereto, which include:
  - a user interface object 120-1, for displaying electronic message(s) assigned thereto, in any one of the following display states:
    first display state 121-1;
    second display state 121-2; and up to
    $n^{th}$ display state 121-n;
  - a user interface object 120-2, for displaying electronic message(s) assigned thereto, in any one of the following display states:
    first display state 122-1;
    second display state 122-2; and up to
    nth display state 122-n;
  - a user interface object set 120-m, for displaying electronic message(s) assigned thereto, in any one of the following display states:
    first display state 123-1;
    second display state 123-2; and up to
    nth display state 123-n.

In some embodiments, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various embodiments. In some embodiments, the memory 306 optionally stores a subset of the modules and data structures identified above. Furthermore, the memory 306 may store additional modules and data structures not described above.

Although FIGS. 2 and 3 show a "device 102" and a "user interface object displaying system 106," respectively, FIGS. 2 and 3 are intended more as functional description of the various features which may be present in computer systems than as a structural schematic of the embodiments described herein. In practice, and as recognized by those of ordinary skill in the art, items shown separately could be combined and some items could be separated.

FIGS. 4A-4H illustrate depictions of example user interfaces 400 of a messaging application 150 for displaying electronic messages in accordance with some embodiments. In some embodiments, the example user interfaces 400 illustrated in FIGS. 4A-4H are displayed by a computing device (e.g., computing device 102, FIG. 2).

Figure 4A:

An example user interface 400 for a messaging application is shown in FIG. 4A. In some embodiments, the example user interface 400 comprises an electronic message list 412. In some embodiments, the electronic message list 412 is displayed in an electronic message list panel (e.g., the portion of user interface 400 with a white background in FIG. 4A). The electronic message list 412 comprises a plurality of user interface objects, such as a user interface object 402-1, a user interface object 404, a user interface object 406, a user interface object 408 and a user interface object 410, etc. In some embodiments, a respective user interface object in the plurality of user interface objects is visually distinct in the electronic message list and represents one or more corresponding electronic messages in a plurality of electronic messages. For example, the user interface object 402-1 corresponds to a group (also called herein a cluster) of electronic messages (e.g., emails) having a collective association. In this case, the group of emails corresponding to the user interface object 402-1 includes nine email messages relating to "Promotions," such as retail sales, newsletters from stores or coupons from businesses. In another example, the user interface object 406 corresponds to a group of electronic messages relating to "Social Updates," such as postings on Google+, or other social networks (e.g., blogs). In yet another example, the user interface objects 404 and 408 correspond to groups of electronic messages having a collective association. For example either one of user interface objects 404 and 408 corresponds to an email conversation thread including at least two email messages having a collective association (e.g., based on subject of the email, recipients and senders or an identification number). In another example, the user interface object 410 corresponds to a single email message from a user named Anna.

In some embodiments, a group of electronic messages is displayed with one or more indicia of a number of messages, in the group of electronic messages, that have a predefined display status. For example, the user interface object 402-1 shown in FIG. 4A is displayed with an indication of a number of electronic messages that have not been previously displayed (e.g., "9 New") in the group of electronic messages, and the user interface object 406 is displayed with an indication of a number of electronic messages that have not been previously displayed (e.g., "2 New") in the group of electronic messages.

FIG. 4A also depicts a plurality of user interface objects displayed in their respective "first display state." For example, the user interface object 402-1 is displayed in first display state and the user interface object 404 is displayed in first display state. In some embodiments, a respective user interface object in the first display state includes at least a subset of the text of the one or more electronic messages associated with the respective user interface object. For example, the user interface object 410 in the first display state, as shown in FIG. 4A, displays at least a subset of the body of the email message from Anna. In some embodiments, a respective user interface object in the first state is displayed with all the text of one electronic message associated with the respective user interface object. For example, the body text of the single email message in the user interface object 410 is fairly short, and the user interface object 410 includes the entire body text of the single email. In some embodiments, a respective user interface object in the first display state includes a subset of the body text of the most recent electronic message (e.g., a most recently received electronic message) in the plurality of electronic messages associated with the respective user interface object.

For example, the user interface object 408 corresponds to an email "thread" or email "conversation," comprising more than one email message. The user interface object 408 in the first display state is displayed with a subset of the text of the most recent email message in the plurality of emails associated with the user interface object 408 (e.g., "Sounds good—I'm in!"). In some embodiments, a respective user interface object in the first display state is displayed with a logo or symbol 414 to assist the user in quickly locating a particular user interface object in the electronic message list.

FIG. 4A also illustrates detection of a user input 405 (e.g., a touch input, a mouse click, etc.) on the electronic message list. In FIG. 4A, the user input 405 is detected on the user interface object 402-1, corresponding to a user selection of the user interface object 402-1.

FIG. 4B illustrates that, in response to detecting user selection of the user interface object 402-1 of the plurality of user interface objects, the user interface object 402-2 in a second state is displayed. Display of the user interface object 402-2 in the second state includes concurrent display of multiple electronic messages in the group of electronic messages. In some embodiments, display of a user interface object in the second state includes concurrent display of all electronic messages in the group of electronic messages. For example, in FIG. 4B, display of the user interface object 402-2 in the second state includes display of all of the nine electronic messages that correspond to the user interface object 402-2. In some embodiments, display of a user interface object in the second state includes display of a subset of electronic messages in the group of electronic messages. For example, in some embodiments, when display of all of the electronic messages that correspond to a user interface object exceeds a display size of a user interface, only a subset of electronic messages in the group of electronic messages is displayed.

In some embodiments, displaying multiple electronic messages in the group of electronic messages includes displaying, for each of the multiple electronic messages in the group of electronic messages, at least a subset of a text of the electronic message. In some embodiments, displaying multiple electronic messages in the group of electronic messages includes foregoing displaying the entire text in the multiple electronic messages. For example, as illustrated in FIG. 4B, display of an electronic message 416 includes display of a subset of a text of the electronic message 416. Thus, in some embodiments, all of the nine electronic messages that correspond to the user interface object 402-2 are deemed to be displayed, even though only a subset of a text is displayed for each of the nine electronic messages.

In some embodiments, the user interface object 402-2 is displayed with an animation. For example, FIG. 4B also shows a subset of user interface objects above the user interface object 402-1 in the electronic message list (e.g., 412, FIG. 4A) moving vertically upward, and a subset of user interface objects below the user interface object 402-1 in the electronic message list moving vertically downward. This allows the user interface object 402-2 to be displayed on the user interface 400. In FIG. 4B, all of the user interface object 402-2 fits on the visible portion of the user interface 400, but in some embodiments, only a portion of the user interface object 402-2 is displayed within the visible portion of the user interface 400 (e.g., when the user interface object 402-2 has more electronic messages than can be displayed within the visible portion of the user interface 400).

Thus, FIGS. 4A-4B illustrate that, in response to detecting user selection of a user interface object in a first state, toggling display of the user interface object from a first state to a second state. In some embodiments, display of the user interface object in the first state is replaced with display of the user interface object in the second state.

FIG. 4B also illustrates detection of a user input 407 (e.g., a touch input, a mouse click, etc.) at a location, on the example user interface 400, that does not correspond to the electronic message list 412.

FIG. 4C shows an exemplary response to detecting the user input 407 (FIG. 4B) at a location that does not correspond to the electronic message list 412. Responsive to user input 407, in FIG. 4C, display of the user interface object 402-2 in the second state is replaced with display of the user interface object 402-3 in the first state. Similar to the user interface object 402-1 shown in FIG. 4A, the user interface object 402-3 corresponds to a group of electronic messages pertaining to "Promotions." However, while the user interface object 402-1 shown in FIG. 4A is displayed with an indication of a number of electronic messages that have not been previously displayed (e.g., "9 New") in the group of electronic messages, the user interface object 402-3 in FIG. 4C is displayed without an indication of a number of electronic messages that have not been previously displayed, because the messages that correspond to the user interface object 402-3 have been displayed (with the display of the user interface object 402-2 in FIG. 4B).

Figure 4D:
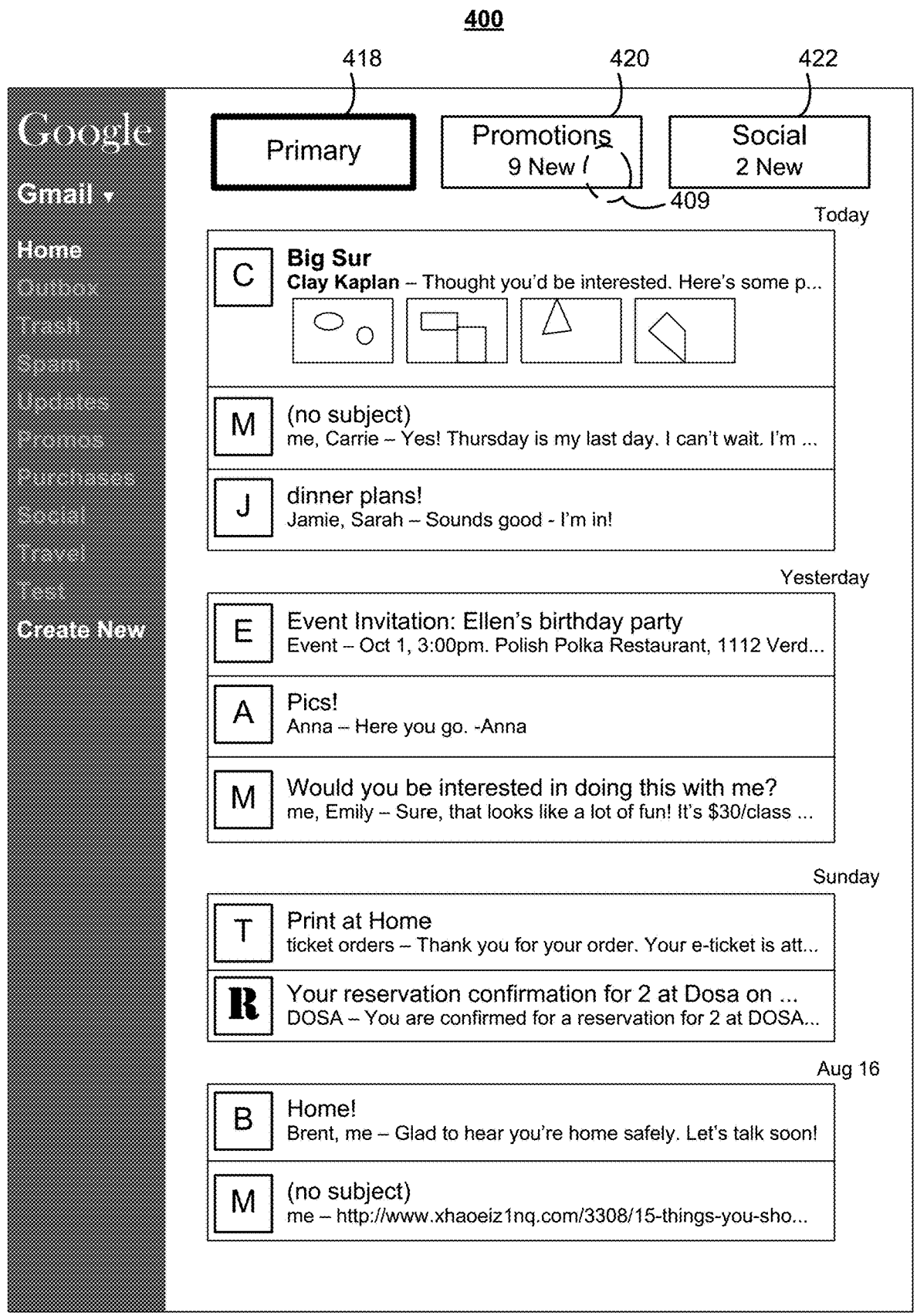
Figure 4E:
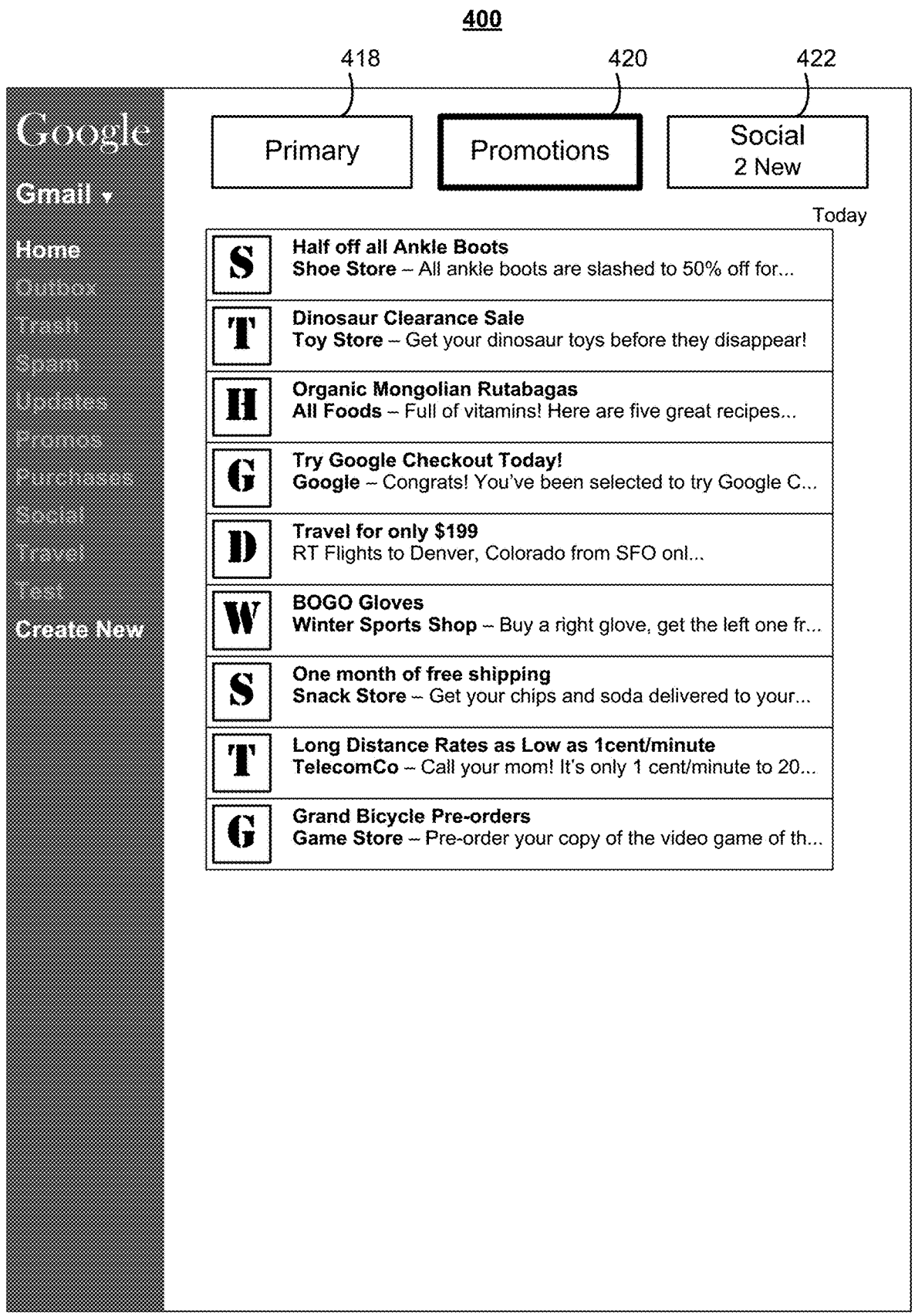

FIGS. 4D-4E illustrate example user interfaces with one or more tabs in accordance with some embodiments.

In FIG. 4D, the user interface 400 includes one or more tabs, such as a first tab 418 for displaying a first group of electronic messages (e.g., electronic messages that are deemed to be primary electronic messages), a second tab 420 for displaying a second group of electronic messages (e.g., electronic messages that are deemed to be promotional messages), and a third tab 422 for displaying a third group of electronic messages (e.g., electronic messages that are deemed to be posts on social networks). In some embodiments, a tab is displayed with an indication of a number of messages, that have a predefined display status, in the group of electronic messages corresponding to the tab. For example, the second tab 420 in FIG. 4D is displayed with an indication of a number of electronic messages that have not been previously displayed (e.g., "9 New") in the group of electronic messages corresponding to the second tab 420 (e.g., promotional messages), and the third tab 422 is displayed with an indication of a number of electronic messages that have not been previously displayed (e.g., "2 New") in the group of electronic messages corresponding to the third tab 422 (e.g., social updates).

FIG. 4D also illustrates detection of a user input 409 (e.g., a touch input, a mouse click, etc.) on the example user interface 400. In FIG. 4D, the user input 409 is detected on the second tab 420, corresponding to a user selection of the second tab 420.

FIG. 4E illustrates that, in response to detecting user selection of the second tab 420, messages in a group of electronic messages corresponding to the second tab 420 are displayed. Display of the messages in the group of electronic messages corresponding to the second tab 420 includes concurrent display of the messages in the group of electronic messages corresponding to the second tab 420. In some embodiments, display of messages in the group of electronic messages includes concurrent display of all electronic messages in the group of electronic messages. For example, in FIG. 4E, all of the nine electronic messages that correspond to the second tab 420 are displayed in response to detecting user selection of the second tab 420. In some embodiments, only a subset of messages in the group of electronic messages is displayed in response to detecting user selection of the second tab 420. For example, in some embodiments, when display of all of the electronic messages that correspond to a tab exceeds a display size of a user interface, only a subset of electronic messages in the group of electronic messages is displayed.

In some embodiments, all of the electronic messages listed in the example user interface 400 are deemed to be displayed, regardless of whether only a subset of a text of each electronic message is displayed.

FIG. 4F illustrates an example user interface 400, which is similar to the example user interface 400 illustrated in FIG. 4A. A user interface object 402-4 in FIG. 4F corresponds to the user interface object 402-1 in FIG. 4A. However, the user interface object 402-4 includes both (i) an indication of a number of messages that have a predefined display status (e.g., unseen messages) and (ii) an indication of a number of messages that have a predefined read status (e.g., unread messages).

Figure 4G:
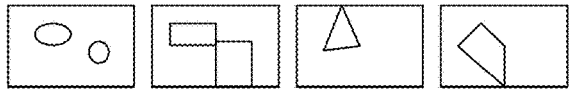

FIG. 4G illustrates an example user interface 400, which is similar to the example user interface 400 illustrated in FIG. 4A. A user interface object 402-5 in FIG. 4G corresponds to the user interface object 402-1 in FIG. 4A. However, the user interface object 402-5 includes both (i) an indication of a number of messages that have a predefined display status (e.g., unseen messages) and (ii) an indication of a number of messages that satisfy predefined timing criteria (e.g., messages received within 24 hours, 12 hours, 2 hours, 1 hour, etc.).

FIG. 4G also illustrates detection of a user input 411 (e.g., a touch input, a mouse click, etc.) on the example user interface 400. In FIG. 4G, the user input 411 is detected on the user interface object 402-5, corresponding to a user selection of the user interface object 402-5.

FIG. 4H illustrates that, in response to detecting user selection of the user interface object 402-5 of the plurality of user interface objects, the user interface object 402-6 in a second state is displayed. Display of the user interface object 402-6 in the second state is similar to display of the user interface object 402-2 described above with respect to FIG. 4B. In FIG. 4H, electronic messages in the user interface object 402-6 are categorized and arranged in accordance with a dichotomous categorization. For example, in FIG. 4H, each electronic message in the user interface object 402-6 is categorized based on whether it satisfies predefined timing criteria (e.g., recent versus not-recent, or recent versus old). In some embodiments, as shown in FIG. 4H, electronic messages that satisfy the predefined timing criteria are collocated (e.g., electronic messages that satisfy the predefined timing criteria are displayed together without any electronic message that does not satisfy the predefined timing criteria between any two electronic messages that satisfy the predefined timing criteria).

Although the one or more indicia shown in FIGS. 4A-4H are illustrated to be included in corresponding user interface objects, a person having ordinary skill in the art would understand that the one or more indicia need not be included in corresponding user interface objects. For example, in some embodiments, the indication of "9 New" for the user interface object 402-1 partially overlaps the user interface object 402-1. In some embodiments, the indication of "9 New" for the user interface object 402-1 is displayed separated from the user interface object 402-1. In some embodiments, the indication of a number of messages that have a predefined display status includes one or more numbers without any text (e.g., a number "9" in a colored circle).

FIGS. 4A-4H are used to describe operations illustrated in FIGS. 5A and 5B.

FIGS. 5A and 5B are example flow charts illustrating a method 500 for displaying messages, in accordance with some embodiments. In some embodiments, the method 500 is performed at a computing device (e.g., device 102, FIG. 2) having one or more processors and memory storing one or more programs for execution by the one or more processors. In some embodiments, the computing device includes a display. In some embodiments, the computing device is coupled with a display, but does not include the display as part of the computing device.

The method includes (502) concurrently displaying (i) a user interface object that represents a group of messages and (ii) one or more first indicia of a number of messages, that have a predefined display status, in the group of messages while foregoing displaying more than one message of the group of messages. For example, in FIG. 4A, the computing device concurrently displays the user interface object 402-1 and an indication of a number of messages, that have a predefined display status (e.g., unseen messages), in the group of nine messages without displaying more than one message in the group of the nine messages.

In some embodiments, the number of messages, in the group of messages, that have the predefined display status does not exceed a predefined number. For example, in accordance with a determination that the number of messages, in the group of messages, that have the predefined display status exceeds the predefined number, one or more first indicia of the predefined number are concurrently displayed with the user interface object that represents the group of messages. In some embodiments, in accordance with a determination that the number of messages, in all groups of messages, that have the predefined display status exceeds the predefined number, one or more messages are deemed to have been previously displayed so that the number of messages, in all groups of messages, that have the predefined display status does not exceed the predefined number. For example, in some embodiments, in accordance with a determination that the number of messages, in all groups of messages, that have the predefined display status exceeds the predefined number, a message that has the predefined display status and meets a predefined timing criteria (e.g., an oldest unseen message) is deemed to have been previously displayed. In some embodiments, this process is repeated until the number of messages, in all groups of messages, that have the predefined display status does not exceed the predefined number.

In some embodiments, a group of messages corresponds to one of a plurality of predefined group categories. In some embodiments, the plurality of predefined group categories includes social, promotions, updates, and forums.

In some embodiments, the method includes (504), prior to the concurrently displaying, selecting the group of messages, from a plurality of messages received or sent by a single user, into the user interface object using a set of content-based clustering rules that are independent of relatedness between the messages in the group of messages. For example, in FIG. 4A, messages that correspond to the user interface object 402-1 are selected in accordance with a determination that the messages are promotional messages (e.g., including one or more keywords that are indicative of promotional messages) regardless of whether the electronic messages are sent by a same sender or have a same subject.

In some embodiments, displaying the user interface object that represents the group of messages includes (506) displaying a portion of a message in the group of messages while foregoing displaying one or more messages, in the group of messages, other than the respective message. For example, in FIG. 4A, the user interface object 402-1 represents a group of nine messages, and a portion of a message (e.g., a sender, such as Shoe Store) is displayed with the user interface object 402-1. In some embodiments, the user interface object is a box that includes the portion of the message. For example, in FIG. 4A, the user interface object 402-1 has a rectangular shape and includes a portion of a message (e.g., a sender). In some embodiments, the method includes displaying a plurality of user interface objects that correspond to respective groups of messages. For example, in FIG. 4A, the user interface object 402-1 represents a group of promotional messages and the user interface object 406 represents a group of social update messages. In some embodiments, the message is a most recent message in the group of messages. For example, in some embodiments, the user interface object includes a portion of a most recent message in the group of messages that correspond to the user interface object (e.g., a most recent message in the promotional messages).

In some embodiments, displaying the user interface object that represents the group of messages includes (508) displaying a tab that corresponds to the group of messages. For example, in FIG. 4D, the user interface object that represents a group of promotional messages is a tab user interface object 420. In some embodiments, displaying the user interface object that represents the group of messages includes displaying a tab that corresponds to the group of messages while foregoing displaying any message of the group of messages. For example, in FIG. 4D, the tab user interface object 420 is displayed without displaying any message of the group of messages that correspond to the tab user interface object 420. In comparison, FIG. 4E illustrates that the tab user interface object 420 is displayed with messages of the group of messages that correspond to the tab user interface object 420.

In some embodiments, messages, that have the predefined display status, in the group of messages include (510) messages, in the group of messages, that have not been displayed previously. In some embodiments, the messages that have not been displayed are called unseen messages. In some embodiments, messages, that have the predefined display status, in the group of messages include messages, in the group of messages, that have been previously displayed. In some embodiments, a message is deemed to have been displayed if at least a portion of a header of the message (e.g., a subject, a sender, etc.) and/or a portion of a body of the message has been displayed.

In some embodiments, the method includes (512) concurrently displaying (i) the user interface object, (ii) one or more second indicia of a number of messages, that have a predefined read status, in the group of messages, and (iii) the one or more first indicia of the number of messages, that have the predefined display status, in the group of messages. For example, in FIG. 4F, the user interface object 402-4 is displayed concurrently with an indication of a number of messages that have a predefined read status (e.g., "9 Unread") and an indication of a number of messages that have a predefined display status (e.g., "9 New"). In some embodiments, the predefined display status is distinct from the predefined read status. For example, whether a message has the predefined display status is independent of whether the message has the predefined read status.

The method includes (514) receiving a selection of the user interface object. For example, in FIG. 4A, the user input 405 is detected, which corresponds to the selection of the user interface object 402-1.

The method includes (516), in response to receiving the selection of the user interface object, displaying messages in the group of messages. For example, as shown in FIG. 4B, messages in the group of messages (e.g., the user interface object 402-2) are displayed. In some embodiments, displaying messages in the group of messages includes displaying a subset of messages in the group of messages, where the subset includes fewer messages than the entire group of messages. For example, in some embodiments, displaying messages in the group of messages includes displaying a predefined number of most recent messages in the group of messages.

In some embodiments, each message in messages in the group of messages is categorized and arranged (518) in accordance with a dichotomous categorization. For example, in some embodiments, the dichotomous categorization classifies each message in to one of two groups based on whether the message meets categorization criteria (e.g., a first group that meets the categorization criteria and a second group that does not meet the categorization criteria). For example, in some embodiments, the dichotomous categorization is based on whether each message has been read previously. In another example, in some embodiments, the dichotomous categorization is based on whether each message is deemed to be recent.

In some embodiments, the displayed messages in the group of messages are grouped in accordance with the dichotomous categorization. For example, in FIG. 4H, messages, in the user interface object 402-6, that are classified into a same group (e.g., a group of recent messages) in accordance with the dichotomous categorization are displayed together (and highlighted in bold).

In some embodiments, the dichotomous categorization is (520) whether a respective message has been received within a predefined time period (e.g., 24 hours, 12 hours, 2 hours, 1 hours, etc.). In some embodiments, messages that have been received within the predefined time period are deemed to be recent messages. In some embodiments, messages that have been received before the predefined time period are not deemed to be recent messages. In some embodiments, the messages that have been received before the predefined time period are deemed to be old messages.

In some embodiments, the method includes (522) concurrently displaying (i) the one or more first indicia of the number of messages, that have the predefined display status, in the group of messages and (ii) one or more second indicia of a number of messages, in the group of messages, that have been received within the predefined time period. For example, in FIG. 4G, an indication of a number of messages that have the predefined display status (e.g., "9 New") for the user interface object 402-5 is displayed concurrently with an indication of a number of messages that have been received within the predefined time period (e.g., "5 Recent"). Modifying the one or more displayed first indicia of the number of messages, that have the predefined display status, in the group of messages includes ceasing to display the one or more first indicia while maintaining the display of the one or more second indicia. For example, in FIG. 4H, the indication of the number of messages that have the predefined display status (e.g., "9 New" shown in FIG. 4G) ceases to be displayed while the indication of the number of messages that have been received within the predefined time period (e.g., "5 Recent") is maintained.

In some embodiments, the method includes concurrently displaying (i) the one or more indicia of the number of messages, that have the predefined display status, in the group of messages and (ii) one or more indicia of a number of messages, in the group of messages, that have a predefined read status (e.g., "9 Unread" in FIG. 4F). Modifying the one or more displayed indicia of the number of messages, that have the predefined display status, in the group of messages includes ceasing to display the one or more indicia of the number of messages, that have the predefined display status, in the group of messages, while maintaining the display of the one or more indicia of the number of messages, in the group of messages, that have the predefined read status. In some embodiments, the method includes updating a read status of a respective message in the group of messages in response to displaying content of the respective message. For example, in accordance with displaying an entire content of the respective message (e.g., in a read pane), a status of the respective message is changed from "unread" to "read."

In some embodiments, each message in the group of messages is associated with a state indicating whether the message has been previously displayed (also called herein "unseen" state). In some embodiments, by default, the state for the message is in a state indicating that the message has not been previously displayed, before the state for the message has been modified. Typically, states of a plurality of messages in the group of messages are modified concurrently. For example, in some embodiments, the method includes, in accordance with displaying the messages in the group of messages, modifying states of all messages in the group of messages so that the states of all messages in the group of messages indicate that all messages in the group of messages have been previously displayed. In some other embodiments, the method includes, in accordance with displaying the messages in the group of messages, modifying states of the displayed messages in the group of messages so that each displayed message in the group of messages has a state indicating that the displayed message has been previously displayed, and foregoing modifying states of messages in the group of messages that have been displayed.

In some embodiments, in response to a request to view "all mails" associated with a user, states of a plurality of messages associated with the user are modified so that each message associated with the user has a state indicating that the message has been previously displayed.

The method includes (524), in accordance with displaying the messages in the group of messages, modifying the one or more displayed first indicia of the number of messages, that have the predefined display status, in the group of messages. In some embodiments, the computing device, in accordance with displaying the messages in the group of messages, ceases to display the one or more first indicia of the number of messages. For example, in FIG. 4B, "9 New" is no longer displayed). In some embodiments, the computing device, in accordance with displaying the messages in the group of messages, updates the number of messages, that have the predefined display status, in the group of messages. For example, in some embodiments, instead of ceasing to display the one or more first indicia, the computing device updates the number of messages (e.g., "0 New"). In another example, when the group of messages includes twenty messages and ten messages of the twenty messages are displayed in response to a user input (e.g., due to the display size), the one or more first indicia of the number of messages are changed to indicate that ten messages remain unseen (e.g., "10 New"). In some embodiments, the method includes modifying the displayed first indicia of the number of unseen messages in the group of messages in response to receiving the selection of the user interface object that represents the group of messages.

In some embodiments, modifying the one or more displayed first indicia of the number of messages, that have the predefined display status, in the group of messages includes (526) ceasing to display the one or more first indicia of the number of messages, that have the predefined display status, in the group of messages. For example, in FIG. 4C, the indication of a number of messages that have the predefined display status (e.g., unseen messages) is not displayed. In some embodiments, the method includes ceasing to display the one or more first indicia of the number of messages, that have the predefined display status, in the group of messages after a predetermined period of time has elapsed. For example, in some embodiments, display of the user interface object 402-1 (FIG. 4A) is replaced with display of the user interface object 402-2 (FIG. 4B) with an animation (e.g., user interface objects above the user interface object 402-1 moving vertically upward and user interface objects below the user interface object 402-1 moving vertically downward), and the indication of a number of messages that have the predefined display status ceases to be displayed after the animation. In some other embodiments, the method includes ceasing to display the one or more first indicia of the number of messages, that have the predefined display status, in the group of messages during the animation.

In some embodiments, the method includes (528) modifying the one or more displayed first indicia of the number of messages after a predetermined period of time subsequent to displaying the messages in the group of messages. In some embodiments, the method includes modifying the one or more displayed indicia of the number of messages in response to displaying the messages in the group of messages. For example, in some embodiments, the one or more displayed indicia are modified upon displaying the messages in the group of messages. In some embodiments, the method includes modifying the one or more displayed indicia of the number of messages while initiating a display of the messages in the group of messages. For example, in some embodiments, the one or more displayed indicia are modified before displaying the messages in the group of messages.

In some embodiments, a message is assigned to two or more groups of messages. Thus, in some embodiments, each group of the two or more groups of messages includes a same message. For example, in some embodiments, a first group of messages includes a particular message and a second group of messages includes the particular message. In some embodiments, in accordance with a determination that the particular message has been previously displayed as part of the first group of messages, the particular message is deemed to be previously displayed as part of the second group of messages. For example, when the particular message has been previously displayed as part of the first group of messages, the particular message is treated as a previously displayed message when displaying the second group of messages (e.g., the particular message is not included in the unseen messages in the second group of messages). In some other embodiments, a determination whether the particular message has been previously displayed as part of the first group of messages is independent of a determination whether the particular message has been previously displayed as part of the second group of messages. Similarly, in some embodiments, a determination whether the particular message has been previously displayed as part of the second group of messages is independent of a determination whether the particular message has been previously displayed as part of the first group of messages. For example, when the particular message has been previously displayed as part of the first group of messages, the particular message is displayed as an unseen message when displayed as part of the second group of messages.

In some embodiments, each message in the group of messages is associated with a state indicating whether the message has been previously displayed. In some embodiments, the method includes modifying states of messages that exceeds a predefined timing criteria (e.g., messages that were received before a predefined period of time) so that such messages are deemed to have been previously displayed.

In some embodiments, each message in the group of messages is associated with a state indicating whether the message has been previously displayed. In some embodiments, the method includes receiving a search query and displaying one or more messages that satisfy the search query while foregoing modifying the states of the one or more messages. For example, in response to a search query that includes a term "shoe," an electronic message that includes the term "shoe" (e.g., an email from "Shoe Store" as illustrated in FIG. 4B) is displayed without modifying the state of the electronic message from Shoe Store. When a group of messages that includes the email from Shoe Store is subsequently displayed as a single user interface object, the email from Shoe Store is treated as unseen until the single user interface object is selected and at least a subset of messages in the group of messages are concurrently displayed.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the embodiment(s).

It will also be understood that, although the terms "first," "second," etc. may be used herein to describe various elements, these elements should not be limited by these terms. These terms are only used to distinguish one element from another. For example, a first user interface object could be termed a second user interface object, and, similarly, a second user interface object could be termed a first user interface object, without changing the meaning of the description, so long as all occurrences of the "first user interface object" are renamed consistently and all occurrences of the "second user interface object" are renamed consistently. The first user interface object and the second user interface object are both user interface objects, but they are not the same user interface object.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative embodiments. For purposes of explanation, numerous specific details were set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method of displaying messages to a user, comprising:
at a computing device having one or more processors and memory storing one or more programs for execution by the one or more processors:
receiving a plurality of electronic messages;
assigning a first subset of the plurality of electronic messages to a predefined group category based on a set of content-based clustering rules and content in respective message bodies of the plurality of electronic messages;
concurrently displaying a second subset of the plurality of electronic messages and a cluster graphic corresponding to the predefined group category, wherein the cluster graphic includes a label that describes the predefined group category;
while concurrently displaying the second subset of electronic messages and the cluster graphic, receiving user selection of the cluster graphic; and
in response to receiving the user selection of the cluster graphic, displaying a plurality of messages in the predefined group category, including displaying at least one message from the first subset of electronic messages.

2. The method of claim 1, wherein each message in the predefined group category is categorized and arranged in accordance with a dichotomous categorization.

3. The method of claim 2, wherein the dichotomous categorization is based on whether respective messages have been received within a predefined time period.

4. The method of claim 1, wherein the cluster graphic further includes a first indicium of a count of messages in the predefined group category not previously presented to the user; and
the method further comprises:
receiving a second plurality of electronic messages;
assigning one or more messages of the second plurality of electronic messages to the predefined group category; and
updating the first indicium to indicate inclusion of the one or more messages in the count of messages in the predefined group category not previously presented to the user.

5. The method of claim 4, further comprising, in accordance with displaying at least one message in the predefined group category not previously presented to the user, modifying the first indicium to reflect a decreased count of messages in the predefined group category not previously presented to the user.

6. The method of claim 5, wherein modifying the first indicium comprises modifying the displayed first indicium after a predetermined period of time subsequent to displaying the messages in the predefined group category.

7. The method of claim 4, wherein the cluster graphic includes a second indicium that shows a count of messages not previously read by the user.

8. The method of claim 4, wherein the cluster graphic includes a second indicium that shows a count of messages received within a predefined recent time period.

9. The method of claim 1, wherein the cluster graphic is labeled by a keyword abbreviation associated with the predefined group category.

10. The method of claim 1, wherein the cluster graphic displays at most one message of the messages in the predefined group category.

11. The method of claim 1, wherein the cluster graphic displays header information for at least one message of the messages in the predefined group category.

12. The method of claim 11, wherein the header information includes information regarding a message subject and/or a message sender.

13. The method of claim 1, further comprising concurrently displaying: (a) the second subset of the plurality of electronic messages, (b) the cluster graphic corresponding to the predefined group category, and (c) a user interface object corresponding to a message conversation comprising one or more electronic messages.

14. The method of claim 13, wherein the user interface object includes display of a message subject and at least a portion of a message body of an electronic message in the message conversation.

15. The method of claim 1, wherein the cluster graphic comprises a tab that corresponds to a message folder having messages in the predefined group category.

16. The method of claim 1, wherein the predefined group category comprises promotional messages or social updates.

17. The method of claim 1, wherein the content-based clustering rules are independent of relatedness between respective messages in the plurality of electronic messages.

18. The method of claim 1, wherein the second subset of the plurality of electronic messages are displayed in accordance with a set of display rules.

19. A computing device, comprising:
one or more processors;
memory; and
one or more programs, wherein the one or more programs are stored in the memory and are configured to be executed by the one or more processors, the one or more programs including instructions for:
receiving a plurality of electronic messages;
assigning a first subset of the plurality of electronic messages to a predefined group category based on a set of content-based clustering rules and content in respective bodies of the plurality of electronic messages;
concurrently displaying a second subset of the plurality of electronic messages and a cluster graphic corresponding to the predefined group category, wherein the cluster graphic includes a label that describes the predefined group category;
while concurrently displaying the second subset of electronic messages and the cluster graphic, receiving user selection of the cluster graphic; and
in response to receiving the user selection of the cluster graphic, displaying a plurality of messages in the predefined group category, including displaying at least one message from the first subset of electronic messages.

20. A non-transitory computer readable storage medium storing one or more programs, wherein the one or more programs comprise instructions for:
receiving a plurality of electronic messages;
assigning a first subset of the plurality of electronic messages to a predefined group category based on a set of content-based clustering rules and content in respective bodies of the plurality of electronic messages;
concurrently displaying a second subset of the plurality of electronic messages and a cluster graphic corresponding to the predefined group category, wherein the cluster graphic includes a label that describes the predefined group category;
while concurrently displaying the second subset of electronic messages and the cluster graphic, receiving user selection of the cluster graphic; and
in response to receiving the user selection of the cluster graphic, displaying a plurality of messages in the predefined group category, including displaying at least one message from the first subset of electronic messages.

* * * * *